United States Patent
Tran

(10) Patent No.: US 10,448,198 B2
(45) Date of Patent: Oct. 15, 2019

(54) SYSTEMS, METHODS, AND DEVICES FOR PRESENCE IDENTIFICATION

(71) Applicant: BBoulder Investments, LLC, Cary, NC (US)

(72) Inventor: Hoang Thanh Tran, Cary, NC (US)

(73) Assignee: BBOULDER INVESTMENTS, LLC, Cary, NC (US)

( * ) Notice: Subject to any disclaimer, the term of this patent is extended or adjusted under 35 U.S.C. 154(b) by 0 days.

(21) Appl. No.: 16/142,298

(22) Filed: Sep. 26, 2018

(65) Prior Publication Data

US 2019/0110157 A1  Apr. 11, 2019

Related U.S. Application Data

(60) Provisional application No. 62/564,657, filed on Sep. 28, 2017.

(51) Int. Cl.
| | |
|---|---|
| *H04W 4/23* | (2018.01) |
| *H04W 4/021* | (2018.01) |
| *H04W 8/20* | (2009.01) |
| *G06Q 30/02* | (2012.01) |

(52) U.S. Cl.
CPC ........ *H04W 4/021* (2013.01); *G06Q 30/0255* (2013.01); *G06Q 30/0261* (2013.01); *G06Q 30/0267* (2013.01); *G06Q 30/0269* (2013.01); *H04W 8/205* (2013.01); *H04W 4/23* (2018.02)

(58) Field of Classification Search
CPC ....... H04W 4/021; H04W 8/205; H04W 4/23; G06Q 30/0269; G06Q 30/0261; G06Q 30/0255; G06Q 30/0267
See application file for complete search history.

(56) References Cited

U.S. PATENT DOCUMENTS

| | | | |
|---|---|---|---|
| 2015/0046276 A1* | 2/2015 | Artman | G06Q 20/202 705/21 |
| 2015/0142552 A1* | 5/2015 | Schmehl | G06Q 30/0269 705/14.41 |
| 2016/0155210 A1* | 6/2016 | Escobedo | G06Q 20/3278 345/676 |
| 2017/0245108 A1* | 8/2017 | Slater | H04W 4/021 |

* cited by examiner

*Primary Examiner* — Chuong A Ngo
(74) *Attorney, Agent, or Firm* — NK Patent Law

(57) ABSTRACT

According to one embodiment, a network device includes an uplink port, a downlink port, a memory, and a processor. The processor is configured for providing a webserver; receiving a request from a mobile device of a user to establish a connection with the downlink port; establishing a first connection between the mobile device and the webserver via the downlink port; determining a media access control (MAC) address of the mobile device; receiving, from a server, user history information associated with the MAC address; and providing targeted information to the mobile device based on the user history information. The processor may be further configured for querying the server using the MAC address to obtain the user history information, collecting new user information and transmitting updated user history information to the server.

20 Claims, 11 Drawing Sheets

300

| MAJESTIC NAIL AND DAY SPA | ☰ |

09/18/2017 - 09:08    [FINISH BOOKING]

WHAT'S YOUR PHONE NUMBER? *

[                                    ☏ ]

FIRST NAME *

[                                   FN ]

LAST NAME *

[                                   LN ]

ANY SPEICIAL REQUESTS? *

[                                      ]

SERVICE

| NATURAL NAILS | NAIL ENHANCEMENT |
| A LA CARTE | WAXING |
| WELLNESS MASSAGE | RELAXATION-SKIN CARE ✓ |

FIG. 6

SYSTEMS, METHODS, AND DEVICES FOR PRESENCE IDENTIFICATION

PRIORITY CLAIM

This application claims priority to U.S. Provisional Patent Application Ser. No. 62/564,657 filed Sep. 28, 2017, the disclosure of which is incorporated herein by reference in its entirety.

TECHNICAL FIELD

The presently disclosed subject matter relates generally to the field of content delivery over a network. More particularly; systems, methods, and devices are disclosed for delivering content to a user's mobile device using a presence-identification device.

BACKGROUND

Currently, small businesses that have limited funds may have little or no ability to enhance their goods and services. Consequently, a small business may miss out on an opportunity to offer expanded goods and services that are tailored to the individual customer. For example, a small business may be limited to only what a service provider happens to suggest or mention to the customer. Furthermore, the information the service provider presents to the customer can often be incomplete and even incorrect. Current marketing and advertising solutions are generally directed toward large business enterprises. Unfortunately, these solutions are generally large-scale expensive solutions, rather than low-cost solutions that small businesses can afford.

In a small business environment, offers for products and/or services are typically made face-to-face once a customer arrives at the business establishment. Consequently, offers are usually made one customer at a time. However, a drawback of this "one at a time" face-to-face interaction is that it is time consuming and inefficient. Further, it requires that service personnel remember and correctly communicate every offer. Accordingly, there remains a need for further contributions in the technologies by which small businesses can provide marketing and advertising information to their customers and in a manner that is affordable.

SUMMARY

Disclosed herein are methods, systems, and devices for delivering content to a mobile device using a presence-identification device. According to one embodiment, a network device (e.g. the presence-identification device) includes an uplink port, a downlink port, a memory, and a processor. The processor is configured for providing a webserver; receiving a request from a mobile device of a user to establish a connection with the downlink port; establishing a first connection between the mobile device and the webserver via the downlink port; determining a media access control (MAC) address of the mobile device; receiving, from a server, user history information associated with the MAC address; and providing targeted information to the mobile device based on the user history information. The processor may be further configured for querying the server using the MAC address to obtain the user history information, collecting new user information, and transmitting updated user history information to the server.

In some embodiments, the downlink port may be a Wi-Fi access point or a personal area network (PAN) interface. The uplink port may be an Ethernet port or a universal serial bus (USB) port. The mobile device may be an activity tracker, a smartwatch, a smartphone, a tablet, a laptop, or the like.

In some embodiments, the server may be a customer relationship management (CRM) server and the server may be hosted in a cloud computing environment. The server may also be a virtual server. The user history information may include a user name, a user phone number, a user email address, a mobile device model number, and/or a mobile device serial number. The user history information may also include a user gender, a user age, and/or a user marital status.

In some embodiments, the webserver may be associated with a business entity and the business entity may be a brick and mortar entity. The targeted information may include a coupon, an advertisement associated with the business entity, and/or user specific check-in information. The targeted information may also include a one-click check-in button.

In some embodiments, the Wi-Fi access point may be configured to transmit a maximum power broadcast signal of less than 50 milliwatts average power. In other embodiments, the Wi-Fi access point may be configured to transmit a maximum power broadcast signal of less than 10 milliwatts average power. In other embodiments, the downlink port may be a millimeter wave access point or a free space optics access point.

In another embodiment, a non-transitory computer readable medium comprises a plurality of machine-readable instructions which when executed by one or more processors of a network device (e.g. a presence-identification device) are adapted to cause the network device to perform a method. The method includes providing a webserver; receiving a request from a mobile device of a user to establish a connection with a downlink port of the network device; establishing a first connection between the mobile device and the webserver; determining a media access control (MAC) address of the mobile device; receiving, from a server via an uplink port of the network device, user history information associated with the MAC address; and providing targeted information to the mobile device based on the user history information. The method may further include querying the server using the MAC address to obtain the user history information and transmitting updated user history information to the server.

In another embodiment, a method is implemented on a network device (e.g. a presence-identification device). The network device includes a processor, a memory, an uplink port, and a downlink port. The method includes providing a webserver; receiving a request from a mobile device of a user to establish a connection with a downlink port of the network device, establishing a first connection between the mobile device and the webserver; determining a media access control (MAC) address of the mobile device; receiving, from a server via an uplink port of the network device, user history information associated with the MAC address; and providing targeted information to the mobile device based on the user history information. The method may further include querying the server using the MAC address to obtain the user history information and transmitting updated user history information to the server.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 6 depicts a presence-identification GUI in accordance with embodiments of the present disclosure.

DETAILED DESCRIPTION

Figure 1:
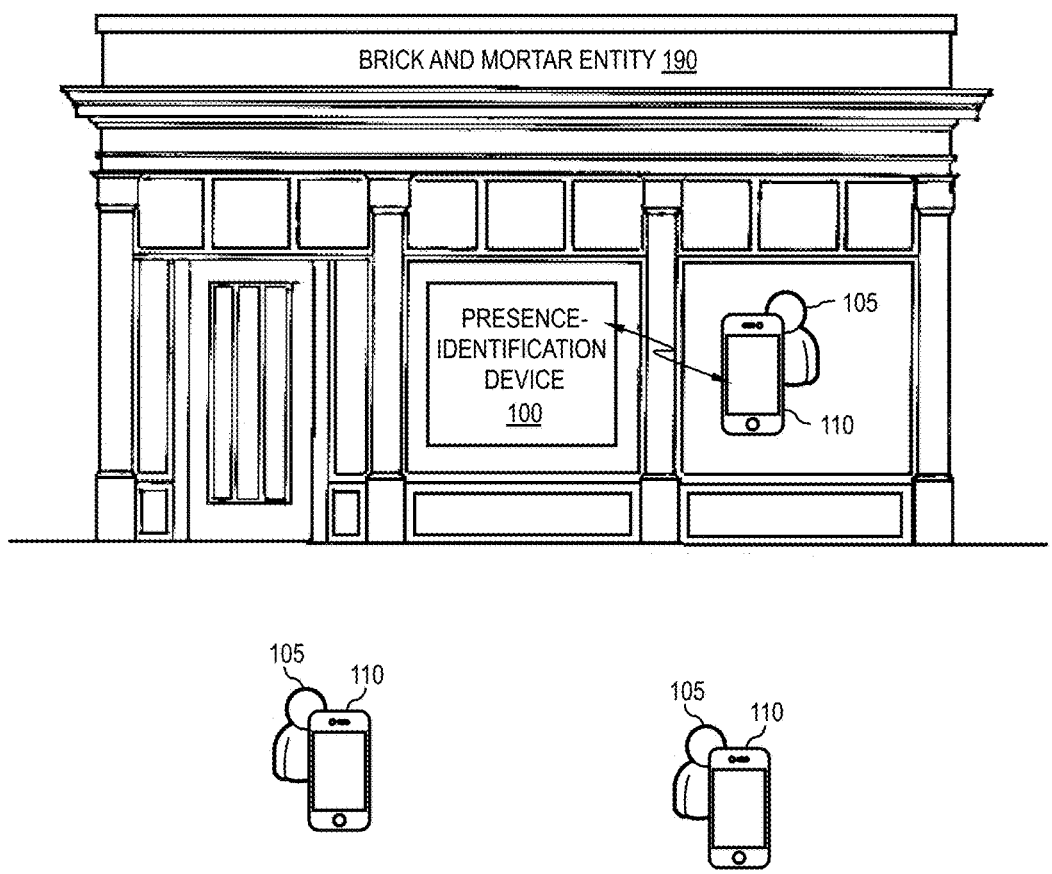
FIG. 1 depicts a block diagram illustrating a presence-identification device supporting a brick and mortar entity in accordance with embodiments of the present disclosure.

This disclosure and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

In some embodiments, the presently disclosed subject matter provides a presence-identification device and system for and methods of delivering content to a mobile device. The presence-identification device allows small businesses to provide marketing and advertising information to their customers in a manner that is affordable.

The presently disclosed presence-identification device can be a software and/or hardware device that is used to (1) discriminate between the onsite persons and the offsite persons by detecting the computing devices of the onsite persons only, (2) associate the MAC address of the detected computing device to a specific person and then store a record thereof, and (3) provide a method by which targeted content can be delivered to each of the onsite persons via their respective computing devices.

The presently disclosed presence-identification system includes a cloud-based network service provider that supports one or more brick and mortar entities (e.g., small businesses), wherein each brick and mortar entity has a presence-identification application running on the presence-identification device. The presence-identification device can be a low-cost near-range Wi-Fi access point that is accessible only by users that are physically present at the brick and mortar entity's physical site (i.e., walk-in customers).

Every computing device has a unique media access control (MAC) address associated therewith. For example, each and every desktop computer, laptop computer, tablet device, and mobile phone or smartphone has a unique MAC address that does not change. Namely, the MAC address can be thought of as kind of serial number, wherein no two computing devices should have the same MAC address. By contrast, an Internet Protocol (IP) address is assigned to every device on a network, so that any device can be located on that network. The IP address is assigned and will change any time the device connects to a different network.

The operation of the presently disclosed presence-identification system is based on the use of MAC addresses. Namely, the presence-identification application running on the presence-identification device is a software and/or hardware application that is programmed to (1) capture the MAC address of any computing device connected to the presence-identification device; (2) prompt the connected user for information, such as, but not limited to, the person's name, phone number, email address, gender, and the like; and (3) generate and store a user record that associates the MAC address to an individual (i.e., the user).

Further, the network service provider of the presently disclosed presence-identification system provides, for example, cloud-based support wherein (1) brick and mortar entity-specific content is developed, stored, and managed; and (2) user information is stored and managed.

In the presently disclosed presence-identification device, system, and methods, by virtue of the fact that a device is connected to the presence-identification device (i.e., a near-range Wi-Fi access point) of a certain brick and mortar entity it is determined that a customer is physically present at the brick and mortar entity's physical site. Accordingly, targeted content can be delivered to the onsite customer's mobile device while they are physically onsite and most likely to take advantage of product and/or service offers.

An aspect of the presently disclosed presence-identification device, system, and methods is that it provides a low-cost entry point by which, for example, small businesses may support a variety of high value features and/or services. Namely, the presently disclosed presence-identification device, system, and methods provides a low-cost, high-value network for delivering content and convenience to small business customers—an alternative to large business solutions.

Referring now to FIG. 1 depicts a block diagram of an example of the presently disclosed presence-identification device 100 for supporting, for example, any brick and mortar entity 190. The brick and mortar entity 190 is representative of any operating space, brick and mortar or otherwise, in which products and/or services can be provided or at least offered to persons 105. The brick and mortar entity 190 can be the operating space of, for example, any small business, a library, a health care provider, and the like.

Certain persons 105 may be physically present within the immediate operating space of the brick and mortar entity 190, while other persons 105 may be nearby but not physically present within the immediate operating space of the brick and mortar entity 190. Those persons 105 that are physically present within the immediate operating space of the brick and mortar entity 190 are hereafter called onsite persons 105. An example of onsite persons 105 are those persons who are physically present inside the building of a small business establishment and in the immediate space in which the business's products and/or services are being offered by service personnel. By contrast, those persons 105 that are not physically present within the immediate operating space of the brick and mortar entity 190 are hereafter called offsite persons 105. Examples of offsite persons 105 are any persons who are not physically present inside the building of a small business establishment. For example, the offsite persons 105 may be outside on the street or in the parking lot of the small business establishment, but not inside where service personnel can interact with them.

Each of the persons 105 (both the onsite persons 105 and the offsite persons 105) may have a respective computing device 110. The computing devices 110 may be any network-enabled mobile device, such as, but not limited to, a laptop computer, a tablet device, a personal digital assistant (PDA) device, a mobile phone or smartphone, and the like.

With respect to the physical operating space of the brick and mortar entity 190, the presently disclosed presence-identification device 100 is designed to discriminate between the onsite persons 105 and the offsite persons 105. For example, using a near-range wireless network, the presence-identification device 100 may detect the presence of the computing devices 110 of the onsite persons 105 while at the same time not detecting the presence of the computing devices 110 of the offsite persons 105. Further, the presence-identification device 100 can handle dynamically the repeated transitions of onsite persons 105 to offsite persons 105 and of offsite persons 105 to onsite persons 105.

Further, once the presence of a certain computing device 110 of an onsite person 105 is detected, the presently disclosed presence-identification device 100 performs the task of associating the MAC address of the certain computing device 110 to the certain onsite person 105 and storing a record thereof. Further, the presently disclosed presence-identification device 100 provides a conduit for delivering targeted content to each of the onsite persons 105 via their respective computing devices 110. Additionally, the presence-identification device 100 can be implemented at the brick and mortar entity 190 using simple and low-cost network infrastructure. More details of the presence-identification device 100 are shown and described herein below with reference to FIG. 2.

Figure 2:
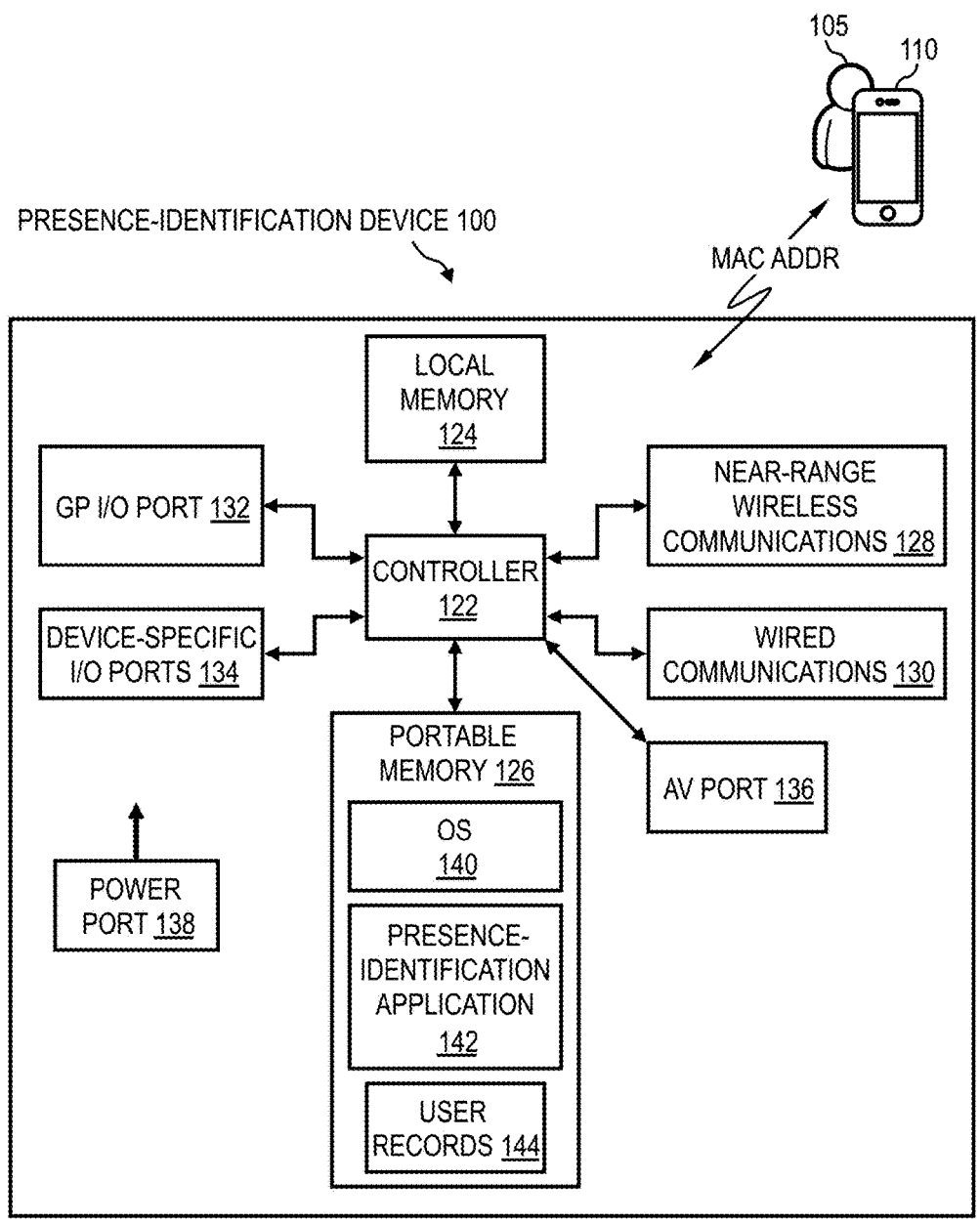
FIG. 2 depicts a block diagram illustrating the presence-identification device in accordance with embodiments of the present disclosure.

FIG. 2 depicts a block diagram of an example of the presently disclosed the presence-identification device 100. Again, the presence-identification device 100 can be a software and/or hardware device that is used to (1) discriminate between the onsite persons 105 and the offsite persons 105 by detecting the computing devices 110 of the onsite persons 105 only, (2) associate the MAC address of the detected computing device 110 to a specific onsite person 105 and then store a record thereof, and (3) provide a method by which targeted content can be delivered to each of the onsite persons 105 via their respective computing devices 110.

In the example shown here in FIG. 2, the presence-identification device 100 is a low-cost near-range Wi-Fi access point that can be implemented, for example, via a low-cost single-board computer device. For example, a single-board system on a chip (SoC) platform that includes, for example, computer processing capability, data storage capability, wired communications capability (e.g., Ethernet), wireless communications capability (e.g., Wi-Fi, Bluetooth®), router capability, programmable input/output (I/O) capability, and the like.

The presence-identification device 100 may include, for example, a controller 122, a quantity of local memory 124, a quantity of portable memory 126, near-range wireless communications 128, wired communications 130, a general purpose (GP) I/O port 132, certain device-specific I/O ports 134, an audio/video (AV) port 136, and a power port 138. Additionally, an operating system (OS) 140, a presence-identification application 142, and user records 144 may be stored on the portable memory 126. In one example, the portable memory 126 is a pluggable microSD card that holds any programming information with respect to the operation of the presence-identification device 100.

The controller 122 can be any microcontroller or microprocessor that is capable of executing program instructions. The local memory 124 can be, for example, the operating random access memory (RAM) of the presence-identification device 100. The near-range wireless communications 128 can include, for example, both 802.11 Wi-Fi technology and Bluetooth® technology. The wired communications 130 can include, for example, one or more Ethernet ports, one or more universal serial bus (USB) ports, and/or one or more high-definition multimedia interface (HDMI) ports. The GP I/O port 132 can be, for example, any arrangement and number of GP I/O pins. The device-specific I/O ports 134 can include, for example, a camera serial interface (CSI) and a display serial interface (DSI). The AV port 136 can include, for example, an audio jack and a composite video jack. The power port 138 can be any receptacle for receiving power, such as a micro-USB port.

In one example, the presence-identification device 100 is implemented using the well-known Raspberry Pi 3 platform available from The Raspberry Pi Foundation (United Kingdom), see www.raspberrypi.org. However, the presence-identification device 100 can be implemented using other single-board computers, such as, but not limited to, the Orange Pi PC 2 platform available from Shenzhen Xunlong Software CO., Limited (www.orangepi.org), and the Asus Tinker Board available from ASUSTeK Computer Inc. (Taipei, Taiwan).

The implementation of the presence-identification device 100 is not limited to using a single-board computer platform, such as described with respect to the presence-identification device 100. The presently disclosed presence-identification device 100 can be implemented in other ways. For example, existing computers, appliances, and/or internet technologies (including cloud) that can be (easily) modified and developed to deploy the presence-identification device 100. Further, with respect to detecting the computing devices 110 of the onsite persons 105 only, various technologies, such as beacon technologies, are available to detect proximity from 100 yards to a few feet. Beacon technologies involve Bluetooth (Bluetooth Low Energy—BLE), or Light, Surface, Sound, and the like.

Figure 3:
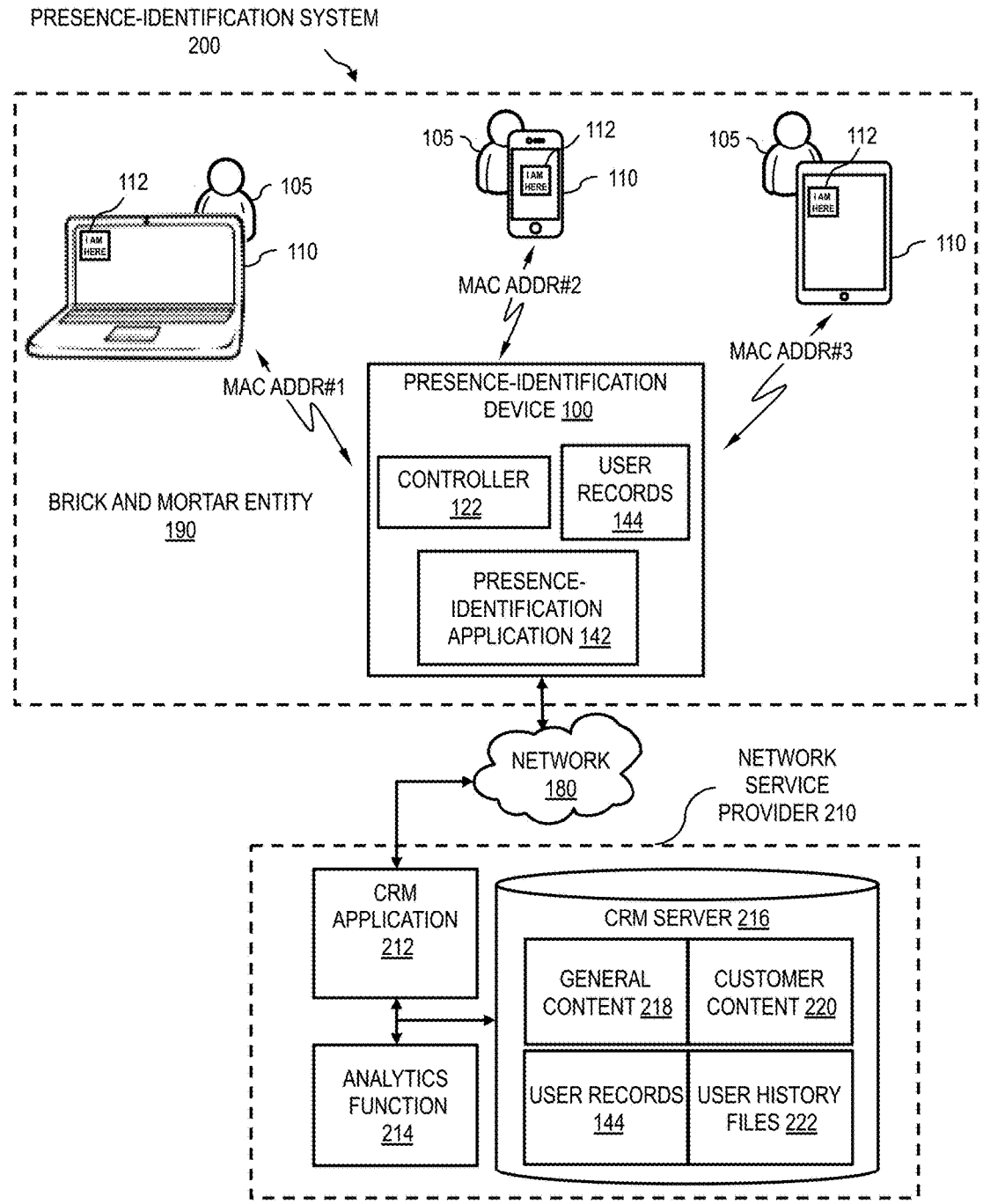
FIG. 3 depicts a block diagram of a presence-identification system including the presence-identification device in accordance with embodiments of the present disclosure.

FIG. 3 depicts a block diagram of an example of a presence-identification system 200 that includes the presently disclosed presence-identification 100. In this system configuration, the presence-identification system 200 supports one brick and mortar entity 190. The presence-identification system 200 includes a network service provider 210 and the brick and mortar entity 190. The network service provider 210 can be, for example, a cloud-based enterprise that includes, for example, a customer relationship management (CRM) application 212, an analytics function 214, and a CRM server 216.

CRM application 212 is, for example, a cloud-based software application that can be used to manage a variety of business processes and information of the brick and mortar entity 190. Namely, for managing content delivery to customers of the brick and mortar entity 190. CRM application 212 can be used to support any number of brick and mortar entity 190 (see FIG. 2). In one example, the CRM application 212 and the presence-identification application 142 of the presence-identification device 100 operate in a client-server architecture wherein the presence-identification application 142 is the counterpart to the CRM application 212.

CRM server 216 can be a database as well as any other applications that may be invoked based on the analytics processes of the analytics function 214. Examples of information that can be stored on CRM server 216 include, but are not limited to, general content 218, customer content 220, user records 144, and user history files 222. The general content 218 can be, for example, a collection or repository of any digital images and/or information. The general content 218 can be organized, for example, by industry (e.g., food service industry, personal care industry, etc.) and/or any other categories or sub-categories.

The brick and mortar entities 190 may be associated with the network service provider 210 by a subscription-based model. As such, the brick and mortar entities 190 may be considered customers of the network service provider 210. Accordingly, the customer content 220 can include any brick and mortar entity 190-specific information. Namely, any brick and mortar entity 190-specific content, such as coupons, specials, any information that a certain network service provider 210 wishes to present to their onsite customers.

The user records 144 are a collection of information about the customers (i.e., persons 105) of the brick and mortar entities 190. Each user record 144 includes, at least, a person's name and phone number and/or email address, as well as the MAC address of the person's mobile device. Optionally, each user record 144 may also include any other information, such as gender, age, marital status, and the like. Accordingly, each user record 144 includes an association of a MAC address to an actual person. Examples of user records 144 are shown below in Tables 1, 2, and 3. Associated with each user record 144 is a user history file 222, which is a record of the activity of a particular person 105 with respect to one or more brick and mortar entities 190.

TABLE 1

Example user record 144

| | |
|---|---|
| Record ID | 0000001 |
| Timestamp | 2017-09-14 10:43:06 |
| MAC Address | 00-14-22-01-23-45 |
| Name | John Doe |
| Phone | (555) 555-1234 |
| Email | — |
| Gender | — |
| Age | — |
| Marital Status | — |

TABLE 2

Example user record 144

| | |
|---|---|
| Record ID | 0000002 |
| Timestamp | 2017-09-14 10:43:06 |
| MAC Address | 38:71:DE:A5:32:05 |
| Name | Jane Doe |
| Phone | (555) 555-5678 |
| Email | janedoe21@gmail.com |
| Gender | — |
| Age | 24 |
| Marital Status | — |

TABLE 3

Example user record 144

| | |
|---|---|
| Record ID | 0000003 |
| Timestamp | 2017-09-14 10:43:06 |
| MAC Address | 78:FD:94:36:A5:9F |
| Name | Joe Smith |
| Phone | (555) 555-9191 |

TABLE 3-continued

Example user record 144

| | |
|---|---|
| Email | jsmith001@yahoo.com |
| Gender | Male |
| Age | 19 |
| Marital Status | Single |

Conventionally, a business entity may provide free Wi-Fi for the convenience of their customers. However, Wi-Fi often has a wide range that extends beyond and/or outside of the physical business site. Therefore, a person may connect to the Wi-Fi network when in the broad vicinity of the business without actually entering and visiting the physical business site. For example, the person connecting to the business's Wi-Fi network may be outside on the street or in the parking lot, but not physically inside the operating space of the business. Further, even by analyzing their network information, the business will have no way of knowing when or if the person ever physically entered their physical business site. By contrast, the presence-identification system 200 provides a mechanism (e.g., the presence-identification device 100) by which it can be known when walk-in customers (i.e., onsite persons 105) are physically present onsite of a business entity.

The brick and mortar entity 190 can be any entity (e.g., any small business) that wishes to provide a low-cost, high-value network for delivering content and convenience to patrons wherein it is known that the walk-in patrons are physically present at the physical site of the brick and mortar entity 190. Accordingly, the brick and mortar entity 190 includes the presence-identification device 100. The controller 122 and the presence-identification application 142 of the presence-identification device 100 are used to generate the user records 144.

Again, the presence-identification device 100 can be a low-cost near-range Wi-Fi access point that is accessible only by the onsite persons 105 at the brick and mortar entity 190, as described in FIG. 2. This is, the Wi-Fi broadcast range of presence-identification device 100 is limited substantially to only the physical space within which the business operates.

Because the presence-identification device 100 is a near-range Wi-Fi access point, only the computing devices 110 of the onsite persons 105 of the brick and mortar entity 190 are within the broadcast range of the presence-identification device 100 and are therefore able to connect to the Wi-Fi network thereof. Once any computing device 110 connects to the Wi-Fi network of the presence-identification device 100, the presence-identification application 142 processes the connection. Namely, the presence-identification application 142 running on the presence-identification device 100 is a software and/or hardware application that is programmed to (1) capture the MAC address of any computing device 110 connected to the presence-identification device 100; (2) prompt the connected onsite person 105 for information, such as, but not limited to, the person's name, phone number, email address, gender, and the like; and (3) generate and store a user record 144 (see Tables 1, 2, 3) that associates the MAC address to an individual (i.e., the certain person 105). By contrast, conventional public networks rely on IP addresses rather than MAC addresses for processing connections and wherein there can be no firm association of an IP address to an actual person.

The presence-identification device 100 of the brick and mortar entity 190 is connected to the cloud-based network service provider 210 via a network 180. The network 180 can be a local area network (LAN) or wide area network (WAN) for connecting to the Internet. The presence-identification device 100 can be connected to the network 180 via any wired or wireless method. Once a user record 144 is created for any person 105, the user record 144 can be transmitted to and stored at CRM server 216 of the network service provider 210.

Information in a given user record 144 in combination with knowledge of the products and services of the brick and mortar entity 190 (e.g., products and services of the small business) can be used to inform the CRM application 212 about what customer content 220 to deliver to a certain person 105 via his/her computing device 110. For example and referring now again to Table 2, Jane Doe is physically present at the place of business of a certain brick and mortar entity 190 and is therefore able to connect to the near-range Wi-Fi access point, which is the presence-identification device 100. Once connected, the presence-identification application 142 running on the presence-identification device 100 captures the MAC address of Jane Doe's computing device 110.

In the example of Table 2, the MAC address of Jane Doe's computing device 110 is 38:71:DE:A5:32:05. The CRM application 212 of the network service provider 210 searches the user records 144 in CRM server 216 for MAC address=38:71:DE:A5:32:05. A match is found in a certain user record 144 and therefore the CRM application 212 now knows that the computing device 110 belongs to Jane Doe, which follows that the CRM application 212 now knows that Jane Doe is physically onsite at the brick and mortar entity 190. Tailored content can now be delivered to Jane Doe's computing device 110 that is based on information in Jane Doe's user record 144 in combination with knowledge of the products and services of the brick and mortar entity 190 (e.g., products and services of the small business). Again, in presence-identification system 200, the ability to associate MAC address=38:71:DE:A5:32:05 to Jane Doe provides a low-cost and simple way for small businesses to deliver a variety of high value features and/or services to Jane Doe specifically.

Figure 4:
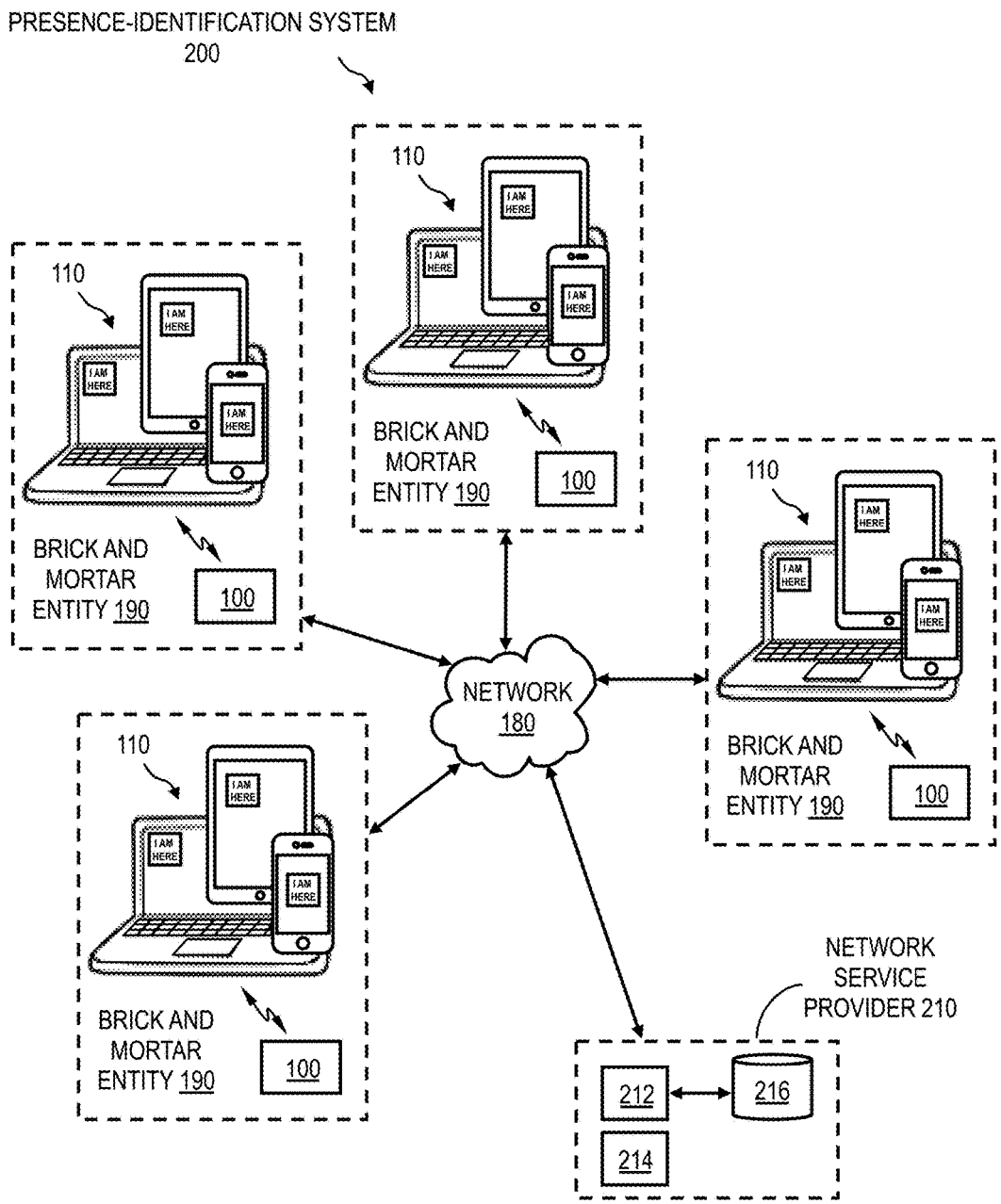
FIG. 4 depicts a block diagram illustrating the presence-identification system supporting a plurality of brick and mortar entities in accordance with embodiments of the present disclosure.

FIG. 4 depicts a block diagram of the presently disclosed presence-identification system 200 that is supporting a plurality of the brick and mortar entities 190. Namely, the cloud-based network service provider 210 can support any number of the brick and mortar entities 190, wherein each of the brick and mortar entities 190 may be a different small business or any other entity.

Figure 5:
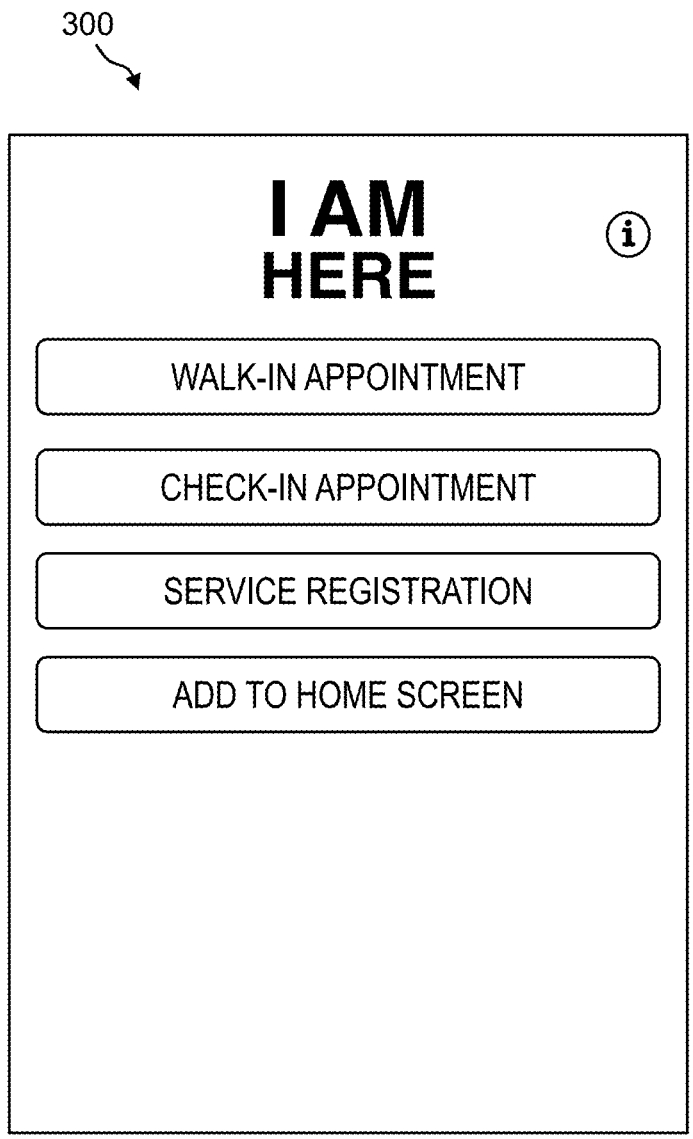
FIG. 5 depicts a presence-identification graphical user interface (GUI) in accordance with embodiments of the present disclosure.
Figure 7:
FIG. 7 depicts a presence-identification GUI in accordance with embodiments of the present disclosure.

FIG. 5, FIG. 6, and FIG. 7 depict an example of a presence-identification graphical user interface (GUI) 300 of the presently disclosed presence-identification device 100 and/or presence-identification system 200.

Once the presence-identification application 142 processes the connection, the presence-identification GUI 300 may be launched automatically on the computing device 110 of the onsite person 105. For example, the presence-identification GUI 300 shown in FIG. 5 has a "Walk-in Appointment" button, a "Check-in Appointment" button, a "Service Registration" button, and an "Add to Home Screen" button. The "Walk-in Appointment" button and the "Check-in Appointment" button provide convenience for the person 105 by eliminating the need to speak directly to the service provider—adding efficiency and value to the brick and mortar entity 190's operations. The "Add to Home Screen" button gives the person 105 the option to have a brick and mortar entity 190-specific icon (e.g., an icon 112 shown on FIG. 3 and FIG. 4) placed on the desktop or homepage of his/her computing device 110. The presence-identification GUI 300 is not limited to these selections, these are exemplary only. The presence-identification GUI 300 can include any number and types of selections. Namely, the presence-identification GUI 300 provides a mechanism by which the person 105 may receive any content. For example, there may be an "Our Products" button, an "Our Services" button, a "Coupons" button, a "Today's Specials" button, and the like.

Once the presence-identification application 142 detects a computing device 110 connected to the near-range Wi-Fi network, the connected onsite person 105 may be prompted for information using the presence-identification GUI 300 shown in FIG. 6. In this example, the onsite person 105 is prompted for his/her name, phone number, and any special requests. Further, push button selections may be provided whereby the person 105 can easily initiate actions.

Certain content that can be delivered to the onsite person 105 via the presence-identification GUI 300, an example of which is shown in FIG. 7. Because knowing when persons 105 are physically onsite at the brick and mortar entities 190 is a main aspect of the presently disclosed presence-identification device 100 and/or presence-identification system 200, the content may be delivered with an "I AM HERE" or "Here@ . . . " theme. In this example, the brick and mortar entity 190 is a nail salon and therefore an "I AM HERE" app for a nail salon is launched, for example, an "I AM HERE@nail_salon_name" or "Here@nail_salon_name" app. The "I AM HERE@nail_salon_name" app may include, for example, a video about products and services, a discount offer, and a special product offering. In the presence-identification system 200, the content for the "I AM HERE" app is sourced from the network service provider 210 and delivered over the Internet (i.e., network 180). The content can be, for example, a link to any web-based content. The content is managed remotely by the CRM application 212 of the network service provider 210. As a result, there need not be a local data repository at each brick and mortar entity 190 and thereby keeping the network infrastructure at each brick and mortar entity 190 simple and low cost.

In other examples, when the brick and mortar entity 190 is a restaurant, the "I AM HERE" app can be the "I AM HERE@restaurant_name" app. When the brick and mortar entity 190 is an oil change service, the "I AM HERE" app can be the "I AM HERE@oil_change_company_name" app. When the brick and mortar entity 190 is a bakery, the "I AM HERE" app can be the "I AM HERE@bakery_name" app.

An aspect of the presence-identification device 100 and/or the presence-identification system 200 is that the network service provider 210 develops and manages brick and mortar entity 190-specific content (e.g., customer content 220). Further, the presence-identification device 100 and/or the presence-identification system 200 provide flexibility to support both static apps and dynamic apps. With respect to dynamic content, the content may be tailored, for example, based on time of day, day of week, day of month, day of year, season of the year, holiday, geographic locations, user history, user information (e.g., user's birthday, user's gender, user's age), and the like. As a result, the presently disclosed presence-identification device 100 and/or presence-identification system 200 is more flexible than large static websites that provide the same information day after day. Further, the presently disclosed presence-identification system 200 reduces or substantially eliminates manual searching as compared with large static websites wherein the user has to manually search the website to find information.

Figure 8:
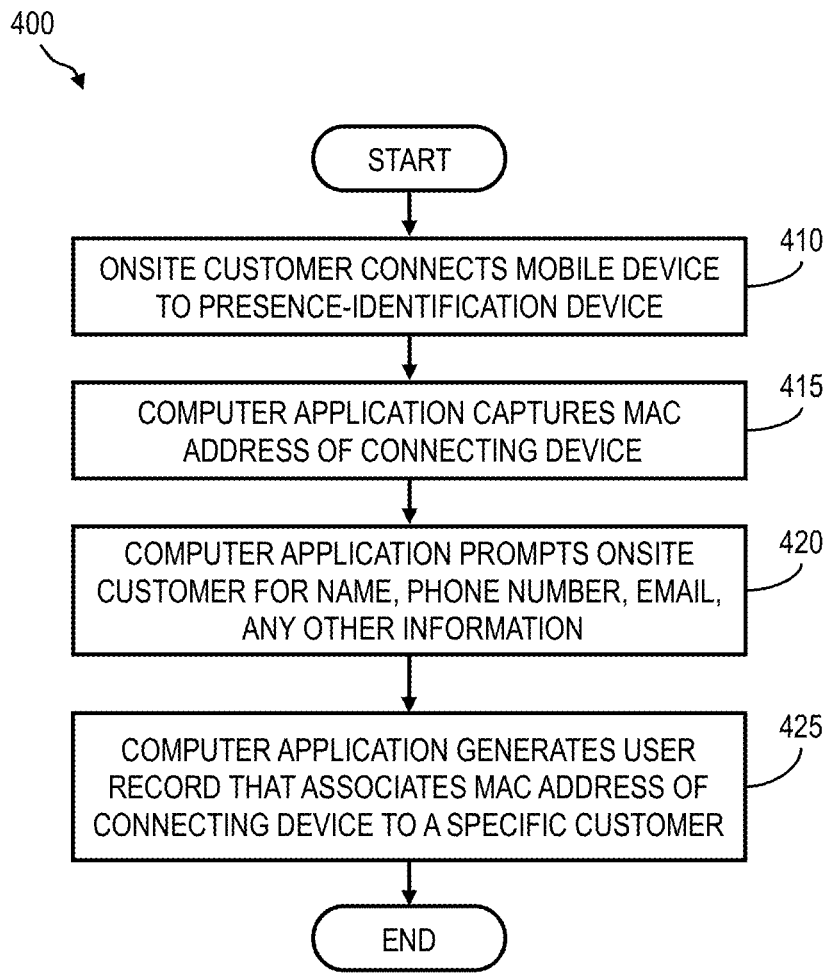
FIG. 8 illustrates a flow diagram of an example of a method of generating a user record that associates a MAC address to a person using the presently disclosed presence-identification device and/or system in accordance with embodiments of the present disclosure.

FIG. 8 depicts a flow diagram of an example of a method 400 of generating a user record 144 that associates a MAC address to a person using the presently disclosed presence-identification device 100 and/or presence-identification system 200. The method 400 includes, but is not limited to, the following steps.

At a step 410, the onsite customer connects his/her mobile device to the presence-identification appliance. For example, using his/her computing device 110, the onsite person 105 searches for, then locates, then connects to the near-range Wi-Fi network of the presence-identification device 100. By connecting to the near-range Wi-Fi network of the presence-identification device 100, it is indicated to the presence-identification application 142 that the person 105 is physically onsite of the brick and mortar entity 190.

At a step 415, a computer application captures the MAC address of the connecting device. For example, the presence-identification application 142 of the presence-identification device 100 captures the MAC address of the connecting computing device 110.

At a step 420, the computer application prompts the onsite customer for his/her name, phone number, email, and/or any other information. For example, the presence-identification application 142 of the presence-identification device 100 prompts the onsite person 105 for his/her name, phone number, email, and/or any other information using, for example, the presence-identification GUI 300 shown in FIG. 5.

At a step 425, the computer application generates a user record that associates the MAC address of the connecting device to a specific customer. For example, the presence-identification application 142 of the presence-identification device 100 generates a user record 144 that associates the MAC address of the connecting computing device 110 to a specific person 105. Examples of user records 144 are shown hereinabove with reference to Tables 1, 2, and 3.

Figure 9:
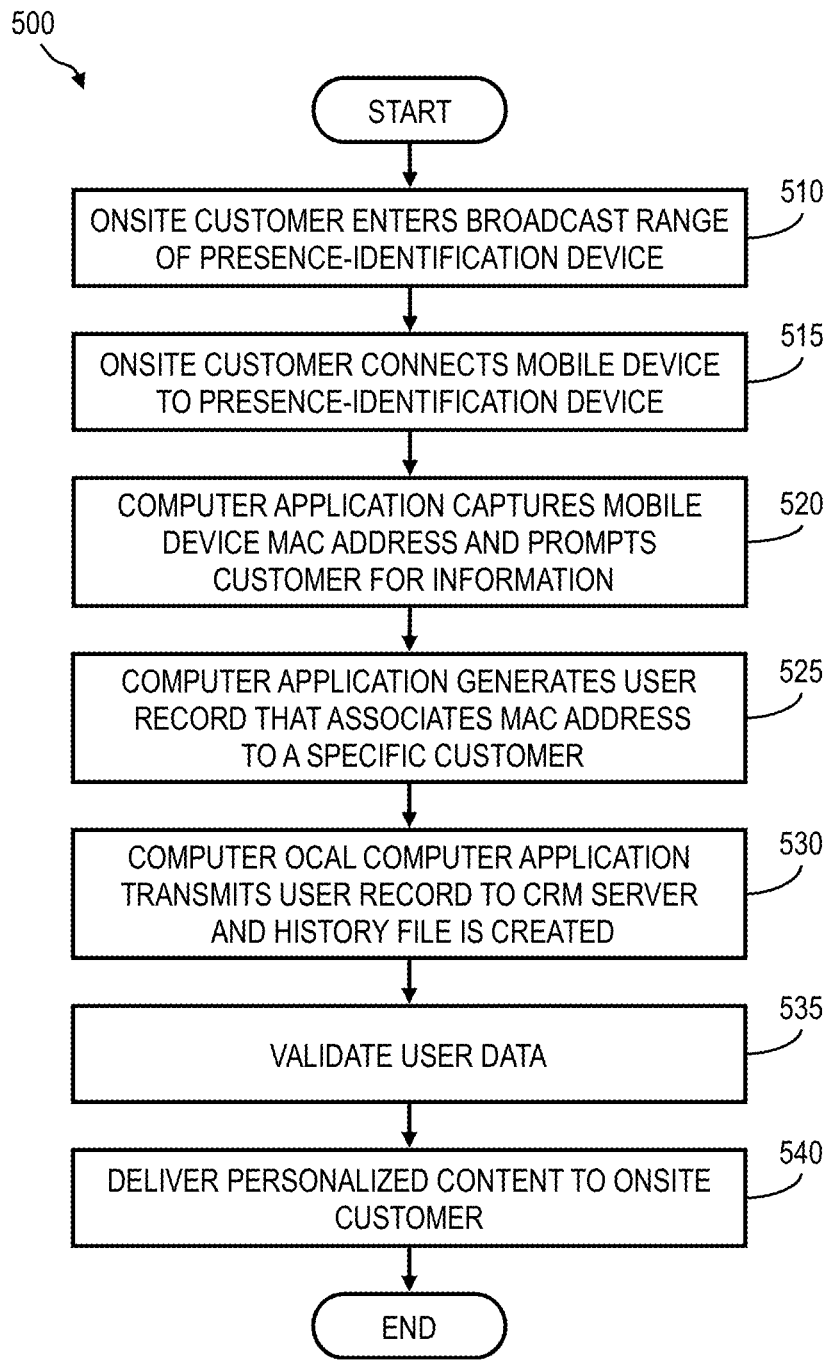
FIG. 9 illustrates a flow diagram of an example of a method of operation of the presently disclosed presence-identification device and/or system in accordance with embodiments of the present disclosure.

FIG. 9 depicts a flow diagram of an example of a method 500 of operation of the presently disclosed presence-identification device 100 and/or presence-identification system 200. An aspect of the method 500 is that because it can be determined that a walk-in customer (e.g., onsite person 105) is physically present at the brick and mortar entity 190-site, targeted content can be delivered to the customer's mobile device while they are physically onsite and most likely to take advantage of product and/or service offers. The method 500 includes, but is not limited to, the following steps.

At a step 510, the onsite customer enters the broadcast range of the presence-identification device 100. For example, the onsite person 105 and his/her computing device 110 enters the broadcast range of the presence-identification device 100.

At a step 515, the onsite customer connects his/her mobile device to the presence-identification device 100. For example, using his/her computing device 110, the onsite person 105 searches for, then locates, then connects to the near-range Wi-Fi network of the presence-identification device 100. By connecting to the near-range Wi-Fi network of the presence-identification device 100, it is indicated to the presence-identification application 142 that the person 105 is physically onsite of the brick and mortar entity 190.

At a step 520, a computer application captures the mobile device MAC address and then prompts the customer for information. For example, the presence-identification application 142 of the presence-identification device 100 captures the MAC address of the connecting computing device 110. Then, the presence-identification application 142 of the presence-identification device 100 prompts the onsite person 105 for his/her name, phone number, email, and/or any other information using, for example, the presence-identification GUI 300 shown in FIG. 5.

At a step 525, the computer application generates a user record that associates the MAC address of the connecting device to a specific customer. For example, the presence-identification application 142 of the presence-identification device 100 generates a user record 144 that associates the MAC address of the connecting computing device 110 to a specific person 105. Examples of user records 144 are shown hereinabove with reference to Tables 1, 2, and 3.

At a step 530, the computer application transmits the user record 144 to the CRM server 216 and a history file is created. For example, the presence-identification application 142 of the presence-identification device 100 transmits the user record 144 to the CRM server 216 of the network service provider 210 and a user history file 222 is created that is related to this specific user record 144.

At a step 535, the user data is validated. Namely, under the control of the CRM application 212 of the network service provider 210 and/or the presence-identification application 142 of the presence-identification device 100, the user data is validated. In one example, the CRM application 212 transmits a validation code via a text message or email to the person 105 in question. If the person 105 receives and enters the code, then a response is generated back to the CRM application 212 and the user data is classified as validated. However, if no response is generated back to the CRM application 212, then the user data is classified as not validated.

At a step 540, personalized content is delivered to the onsite customer. For example, using information in a given user record 144 in combination with knowledge of the products and services of the brick and mortar entity 190 (e.g., products and services of the small business), the CRM application 212 (and with help from the analytics function 214) can be informed about what customer content 220 to deliver to the certain onsite person 105 via his/her computing device 110. For example, the content may be tailored based on the age, gender, and past purchases (found in the user history file 222, if any) of the certain onsite person 105. The presence-identification GUI 300 shown in FIG. 7 is an example of personalized content that can be delivered to the onsite person 105.

Figure 10:
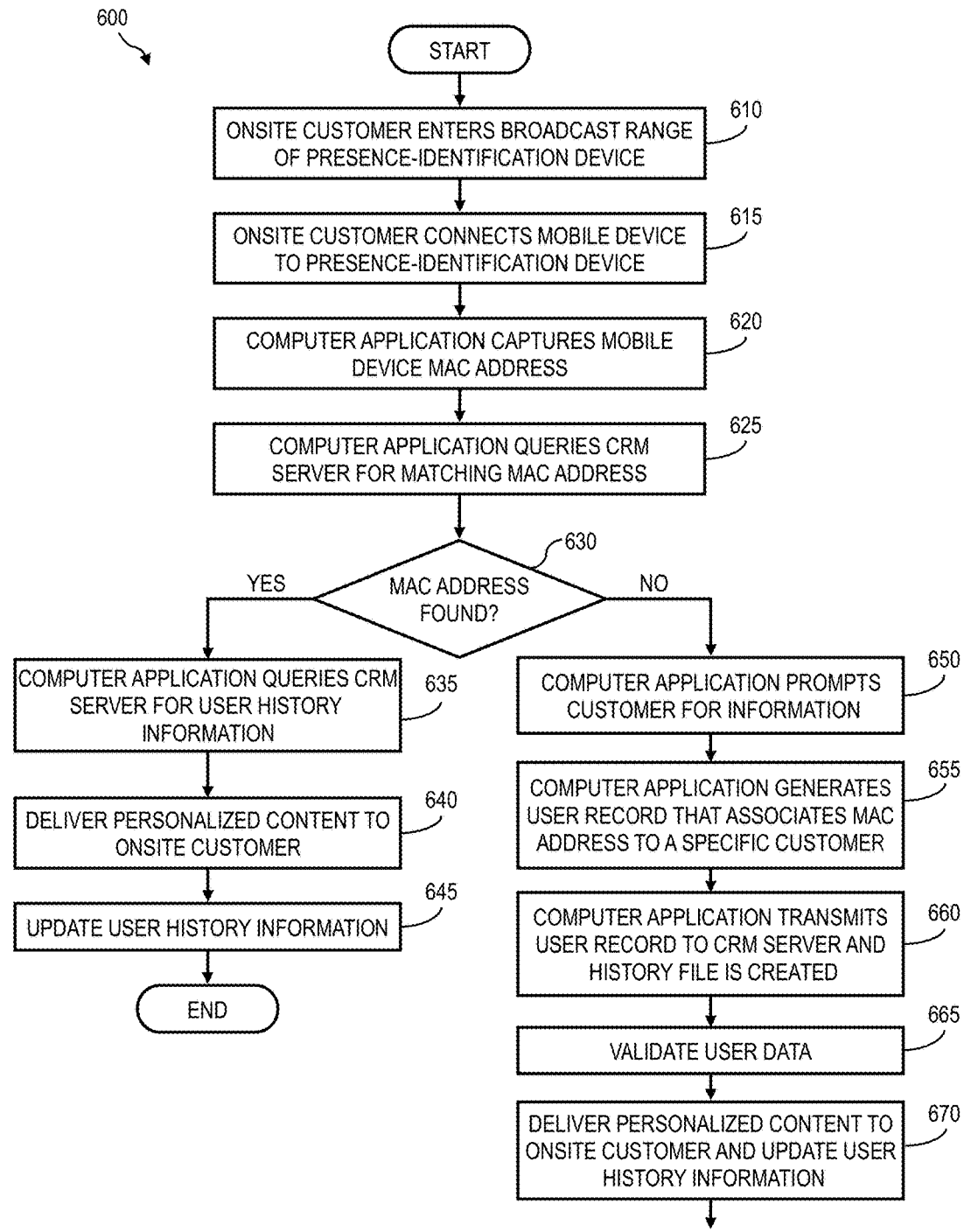
FIG. 10 illustrates a flow diagram of another example of a method of operation of the presently disclosed presence-identification device and/or system in accordance with embodiments of the present disclosure.

FIG. 10 depicts a flow diagram of another example of a method 600 of operation of the presently disclosed presence-identification device 100 and/or presence-identification system 200. An aspect of the method 600 is that because it can be determined that a walk-in customer (e.g., onsite person 105) is physically present at the brick and mortar entity 190-site, targeted content can be delivered to the customer's mobile device while they are physically onsite and most likely to take advantage of product and/or service offers. The method 600 includes, but is not limited to, the following steps.

At a step 610, the onsite customer enters the broadcast range of the presence-identification device 100. For example, the onsite person 105 and his/her computing device 110 enters the broadcast range of the presence-identification device 100.

At a step 615, the onsite customer connects his/her mobile device to the presence-identification device 100. For example, using his/her computing device 110, the onsite person 105 searches for, then locates, then connects to the near-range Wi-Fi network of the presence-identification device 100. By connecting to the near-range Wi-Fi network of the presence-identification device 100, it is indicated to the presence-identification application 142 that the person 105 is physically onsite of the brick and mortar entity 190.

At a step 620, a computer application captures the mobile device MAC address and then prompts the customer for information. For example, the presence-identification application 142 of the presence-identification device 100 captures the MAC address of the connecting computing device 110. Then, the presence-identification application 142 of the presence-identification device 100 prompts the onsite person 105 for his/her name, phone number, email, and/or any other information.

At a step 625, the computer application queries the CRM server 216 for a matching MAC address. For example, the CRM application 212 of the network service provider 210 and/or the presence-identification application 142 of the presence-identification device 100 queries the collection of user records 144 on the CRM server 216 of the network service provider 210 for a matching MAC address.

At a decision step 630, it is determined whether there is a matching MAC address in the CRM server 216. If a matching MAC address is found, then the method 600 proceeds to step 635. However, if a matching MAC address is not found, then the method 600 proceeds to step 650.

At a step 635, the computer application queries the CRM server 216 for user history information. For example, the CRM application 212 of the network service provider 210 and/or the presence-identification application 142 of the presence-identification device 100 queries the user history file 222 associated with the user record 144 containing the matching MAC address.

At a step 640, personalized content is delivered to the onsite customer. For example, using information in a given user record 144 in combination with knowledge of the products and services of the brick and mortar entity 190 (e.g., products and services of the small business), the CRM application 212 (and with help from the analytics function 214) can be informed about what customer content 220 to deliver to the certain person 105 via his/her computing device 110. For example, the content may be tailored based on the age, gender, and past purchases (found in the user history file 222, if any) of the certain person 105. The presence-identification GUI 300 shown in FIG. 7 is an example of personalized content that can be delivered to the onsite person 105.

At a step 645, the user history information is updated. For example, the user history file 222 associated with the user record 144 containing the matching MAC address is updated. The method 600 ends.

At a step 650, the computer application prompts the customer for information. For example, the presence-identification application 142 of the presence-identification device 100 prompts the onsite person 105 for his/her name, phone number, email, and/or any other information using, for example, the presence-identification GUI 300 shown in FIG. 5.

At a step 655, the computer application generates a user record that associates the MAC address of the connecting device to a specific customer. For example, the presence-identification application 142 of the presence-identification device 100 generates a user record 144 that associates the MAC address of the connecting computing device 110 to a specific person 105. Examples of user records 144 are shown hereinabove with reference to Tables 1, 2, and 3.

At a step 660, the computer application transmits the user record 144 to the CRM server 216 and a history file is created. For example, the presence-identification application 142 of the presence-identification device 100 transmits the user record 144 to the CRM server 216 of the network service provider 210 and a user history file 222 is created that is related to this specific user record 144.

At a step 665, the user data is validated. Namely, under the control of the CRM application 212 of the network service provider 210 and/or the presence-identification application 142 of the presence-identification device 100, the user data is validated. In one example, the CRM application 212 transmits a validation code via a text message or email to the person 105 in question. If the person 105 receives and enters the code, then a response is generated back to the CRM application 212 and the user data is classified as validated. However, if no response is generated back to the CRM application 212, then the user data is classified as not validated.

At a step 670, personalized content is delivered to the onsite customer. For example, using information in a given user record 144 in combination with knowledge of the products and services of the brick and mortar entity 190 (e.g., products and services of the small business), the CRM application 212 (and with help from the analytics function 214) can be informed about what customer content 220 to deliver to the certain person 105 via his/her computing device 110. For example, the content may be tailored based on the age, gender, and past purchases (found in the user history file 222, if any) of the certain person 105. The presence-identification GUI 300 shown in FIG. 7 is an example of personalized content that can be delivered to the onsite person 105. Further, the user history file 222 associated with the user record 144 is updated. The method 600 ends.

Figure 11:
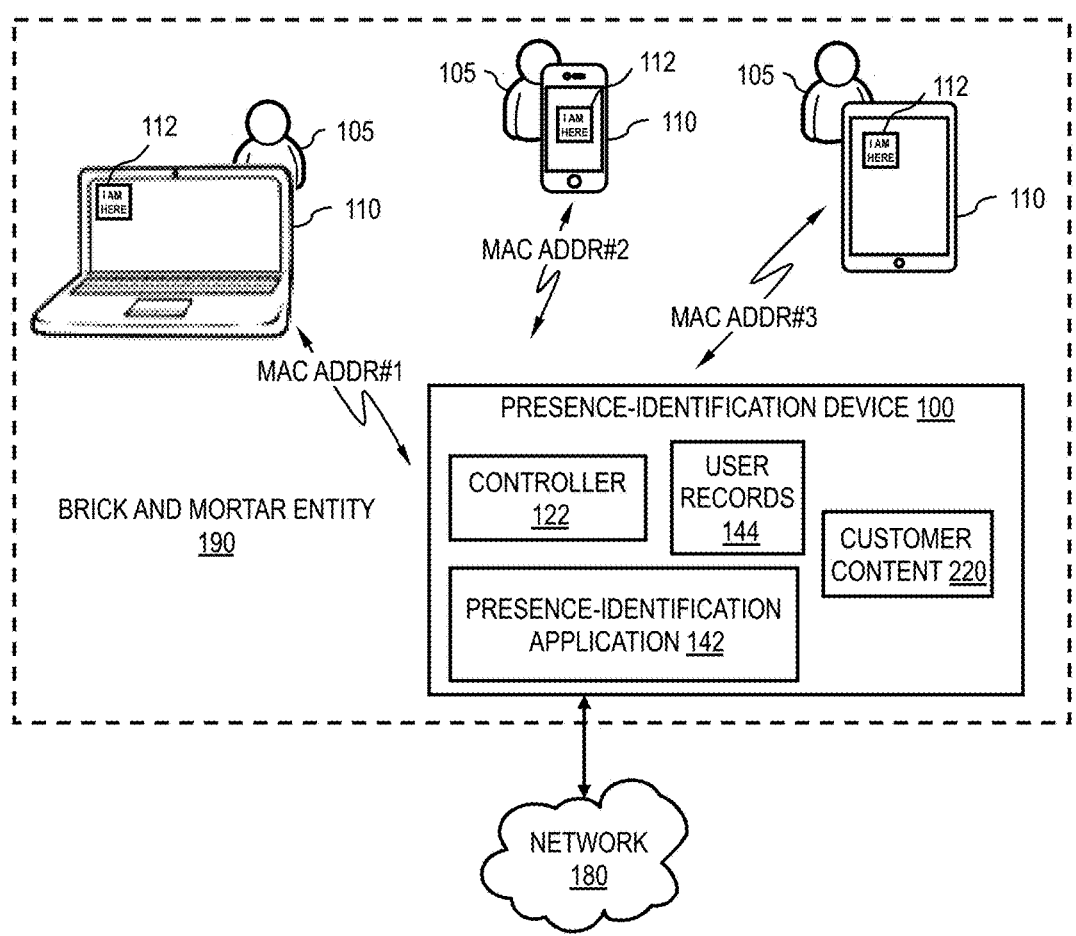
FIG. 11 illustrates a block diagram of an example of a standalone configuration of the presently disclosed presence-identification system in accordance with embodiments of the present disclosure.

FIG. 11 depicts a block diagram of a presence-identification system 700, which is an example of a standalone configuration of the presently disclosed presence-identification system 200. The presence-identification system 700 is substantially the same as the presence-identification system 200 shown with reference to FIG. 3 and FIG. 4 except that the network service provider 210 is omitted and the customer content 220 resides locally at the brick and mortar entity 190. In this example, in addition to its role of generating user records 144 that associate a MAC address to a person, the presence-identification application 142 further functions to manage the delivery of content to the onsite (or walk-in) persons 105. In the presence-identification system 700 there may be no user history and no analytics.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "device" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C#, Objective-C, Go, Scala, Swift, Kotlin, OCaml, SAS, Tensorflow, CUDA, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a device, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network device configured to be physically located within a business brick and mortar entity, the network device comprising:
    an uplink port;
    a downlink port;
    a memory; and
    a processor configured for:
        providing a webserver associated with the business brick and mortar entity;
        receiving a request from a mobile device of a user to establish a connection with the downlink port;
        establishing a first connection between the mobile device and the webserver via the downlink port;
        determining a media access control (MAC) address of the mobile device;
        receiving, from a server, user history information associated with the MAC address; and
        providing targeted information to the mobile device based on the user history information, wherein the targeted information is configured to automatically launch a graphic user interface (GUI) on the mobile device specific to the business brick and mortar entity, the GUI comprising at least two of:
            a button associated with a walk-in appointment request;
            a button associated with an existing appointment check-in;
            a button associated with daily specials of products or services; and
            a button to add an icon specific for the business brick and mortar entity to a home screen of the mobile device;
        and
        receiving updated user history information from the mobile device.

2. The network device of claim 1, wherein the downlink port is a Wi-Fi access point.

3. The network device of claim 2, wherein the Wi-Fi access point is configured to transmit a maximum power broadcast signal of less than 50 milliwatts average power.

4. The network device of claim 2, wherein the Wi-Fi access point is configured to transmit a maximum power broadcast signal of less than 10 milliwatts average power.

5. The network device of claim 1, wherein the downlink port is a personal area network (PAN) interface.

6. The network device of claim 1, wherein the uplink port is at least one of an Ethernet port and a universal serial bus (USB) port.

7. The network device of claim 1, wherein the mobile device is at least one of an activity tracker, a smartwatch, a smartphone, a tablet, and a laptop.

8. The network device of claim 1, wherein the server is a customer relationship management (CRM) server hosted within a cloud computing environment.

9. The network device of claim 1, wherein the user history information includes at least one of a user name, a user phone number, a user email address, a mobile device model number, and a mobile device serial number.

10. The network device of claim 1, wherein the user history information further includes at least one of a user gender, a user age, and a user marital status.

11. The network device of claim 1, wherein the targeted information includes at least one of a coupon and an advertisement associated with the business brick and mortar entity.

12. The network device of claim 1, wherein the targeted information includes user specific check-in information.

13. The network device of claim 12, wherein the targeted information includes a one-click check-in button.

14. The network device of claim 1, wherein the processor is further configured for querying the server using the MAC address to obtain the user history information.

15. The network device of claim 1, wherein the processor is further configured for transmitting the updated user history information to the server.

16. The network device of claim 1 wherein the downlink port is at least one of a millimeter wave access point and a free space optics access point.

17. The network device of claim 1, wherein the GUI is provided on the mobile device by an application that is specific for the business brick and mortar entity and the GUI is configured to prompt the user for the updated user history information.

18. The network device of claim 17, wherein the application is configured to display notification that the mobile device is in proximity of the business brick and mortar entity.

19. A non-transitory computer readable medium comprising a plurality of machine-readable instructions which when executed by one or more processors of a network device are adapted to cause the network device to perform a method comprising:
   providing a webserver associated with a business brick and mortar entity;
   receiving a request from a mobile device of a user to establish a connection with a downlink port of the network device;
   establishing a first connection between the mobile device and the webserver;
   determining a media access control (MAC) address of the mobile device;
   receiving, from a server via an uplink port of the network device, user history information associated with the MAC address;
      providing targeted information to the mobile device based on the user history information, wherein the targeted information is configured to automatically launch a graphic user interface (GUI) on the mobile device specific to the business brick and mortar entity, the GUI comprising at least two of:
         a button associated with a walk-in appointment request;
         a button associated with an existing appointment check-in;
         a button associated with daily specials of products or services; and
         a button to add an icon specific for the business brick and mortar entity to a home screen of the mobile device;
   and
   receiving updated user history information from the mobile device.

20. A method implemented on a network device; wherein the network device is configured to be physically located within a business brick and mortar entity, the network device includes a processor, a memory, an uplink port, and a downlink port; the method comprising:
   providing a webserver associated with the business brick and mortar entity;
   receiving a request from a mobile device of a user to establish a connection with a downlink port of the network device;
   establishing a first connection between the mobile device and the webserver;
   determining a media access control (MAC) address of the mobile device;
   receiving, from a server via an uplink port of the network device, user history information associated with the MAC address;
   providing targeted information to the mobile device based on the user history information, wherein the targeted information is configured to automatically launch a graphic user interface (GUI) on the mobile device specific to the business brick and mortar entity, the GUI comprising at least two of:
      a button associated with a walk-in appointment request;
      a button associated with an existing appointment check-in;
      a button associated with daily specials of products or services; and
      a button to add an icon specific for the business brick and mortar entity to a home screen of the mobile device;
   and
   receiving updated user history information from the mobile device.

* * * * *